UNITED STATES PATENT OFFICE

SAMUEL A. LEAVITT, OF GORHAM, NEW HAMPSHIRE.

COMPOSITION OF MATTER.

No. 930,976.  Specification of Letters Patent.  Patented Aug. 10, 1909.

Application filed March 16, 1908. Serial No. 421,463.

*To all whom it may concern:*

Be it known that I, SAMUEL A. LEAVITT, a citizen of the United States of America, residing at the town of Gorham, in the State of New Hampshire, in the United States of America, have invented certain new and useful Improvements in a Composition of Matter, of which the following is a specification.

The invention relates to new and useful acid-proof composition of matter adapted to be applied in its plastic state, and having valuable properties as a cement.

The invention consists essentially in the mixture in or about the proportions named of acid-proof and other elements to produce a plastic mass, as fully described in the present specification and pointed out in the claims.

The composition is made up of 20 to 30 parts litharge, 10 to 15 parts quartz, 5 to 10 parts calcined plaster, and 1 to 5 parts lampblack. The above ingredients are ground to a suitable degree of fineness, and are then thoroughly mixed with a liquid, such as glycerin, sufficient liquid being added, approximately 10 to 15 parts, to bring the mixture to a mortar-cement state. The above ingredients are all easily obtained and inexpensive, this being an important factor where the compound is used as a mortar, as in lining pulp-wood digesters with brick.

Heretofore no substance has been known, which will effectually withstand the heat and pressure of sulfuric acid, as found in the operation of these digesters and at the same time fulfil the requirements of an adequate mortar for retaining the brick lining in position.

In actual use, as above described, the interior of a digester after the "cook", that is the pulp-wood, sulfuric acid and steam has been "blown" or emptied from the digester, will always show a dampness on the surface due to the glycerin, part of which works its way to the surface on the contraction of the lining, which glycerin is absorbed when the digester is again heated.

An important feature of the above-described composition of matter is that when heated it possesses a certain degree of elasticity, which enables it to expand with any substance to which it may be applied without cracking or separating from the said substance.

The composition of matter makes an excellent substance for cement purposes, and may be applied in its plastic state to meet the requirements of a cement, for filling or for the protection of any substance subjected to the action of heat and acids.

What I claim as my invention is:

1. The hereindescribed expansile acid-proof cement for lining digesters or the like, consisting of litharge, quartz, calcined plaster and lamp black, all brought to a plastic condition by the admixture of glycerin.

2. The herein-described expansible acid-proof cement for lining digesters or the like, consisting of twenty to thirty parts litharge, ten to fifteen parts quartz, five to ten parts calcined plaster, one to five parts lampblack, all brought to a plastic condition by the admixture of ten to fifteen parts glycerin.

Signed at the city of Ottawa, in the Province of Ontario, of the Dominion of Canada this 10th day of March 1908.

SAMUEL A. LEAVITT.

Witnesses:
LLOYD BLACKMORE,
W. T. CUFFE-QUIN.